June 30, 1931.          D. M. KLAUSMEYER          1,812,487
                          AUTOMOBILE BODY
                        Filed March 15, 1928

Inventor
David M. Klausmeyer

By Blackmore, Spencer & Hrub
                              Attorneys

Patented June 30, 1931

1,812,487

UNITED STATES PATENT OFFICE

DAVID M. KLAUSMEYER, OF DETROIT, MICHIGAN, ASSIGNOR TO GENERAL MOTORS CORPORATION, OF DETROIT, MICHIGAN, A CORPORATION OF DELAWARE

AUTOMOBILE BODY

Application filed March 15, 1928. Serial No. 261,935.

This invention relates to automobile bodies of the coupé or roadster type, and more particularly to an improvement in rumble or auxiliary seats located within and forming a part of the rear deck.

Automobile bodies of the roadster or coupé type that are provided with rumble or dickey seats to fill an occasional need for increased seating capacity, have recently met with popular approval. In satisfying public demand for rumble seats, automobile manufacturers generally follow the economical practice of securing a seat cushion on the floor of the deck and a back cushion on the hinged closure lid for the entrance opening to the inside of the deck, so that when the door is swung open to a substantially vertical position, the cushion carried thereby forms a back rest. Due to limited space in the rear deck, particularly on the smaller cars having short length bodies, and also because of the fact that the door or lid folds down directly over the seat, it has been a problem for the car manufacturer to provide deep cushions for the comfort of rumble seat passengers.

To meet the situation, it is here proposed to provide a seat cushion that will slide forward and out of the way of the back cushion when the lid is closed. In this manner the use of cushions of greater depth is made possible. The invention also contemplates the employment of interconnected levers for holding the closure door in an open or back rest position, and for moving the seat cushion in a horizontal direction, in accord and in unison with the swinging movement of the door.

Figure 1:
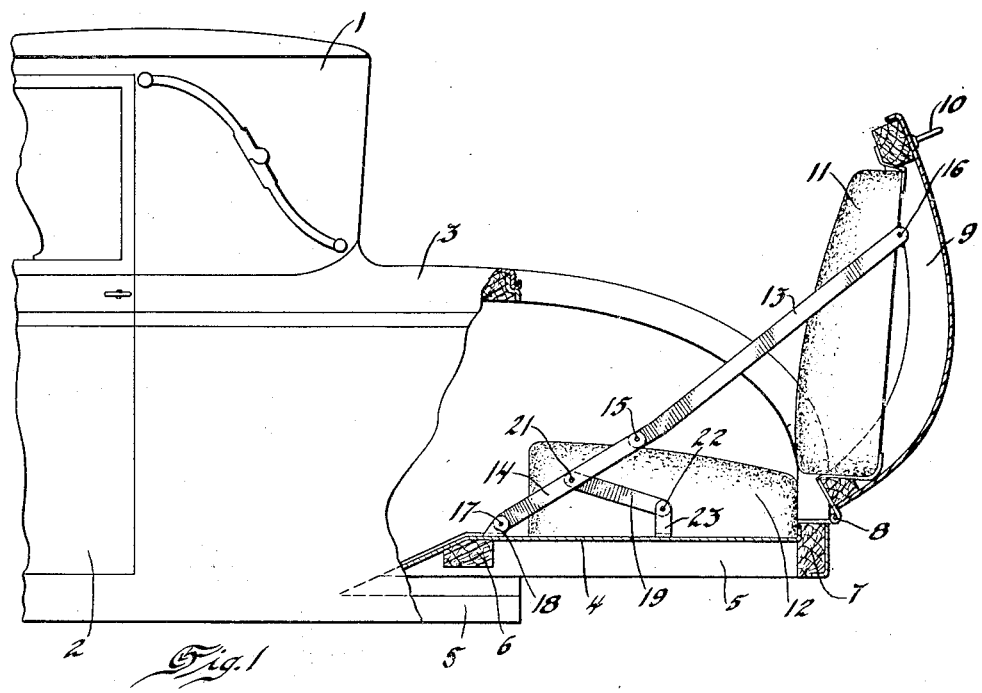
Figure 2:
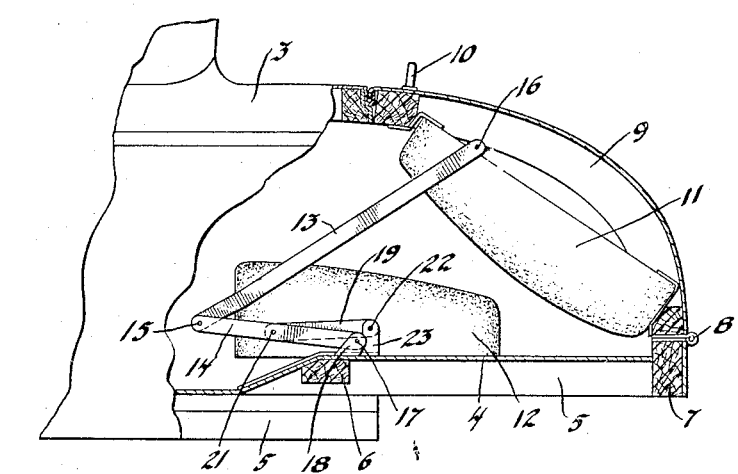

A preferred, but not necessarily the only, embodiment of the invention is illustrated in the accompanying drawings, wherein Figures 1 and 2 are fragmentary side elevations of a rear portion of an automobile body, parts being broken away and shown in section, illustrating the auxiliary seat construction in opened and closed positions respectively.

Referring to the drawings, the numeral 1 indicates the top covering for the conventional passenger seats in the front of the body, 2 is a door in the side of the body leading to the front seats and 3 is the rear deck or enclosed compartment behind the front seats. The floor 4 of the rear deck, which, if desired, may be stamped or pressed from sheet metal to the desired shape, is supported upon suitable longitudinally extending body sills 5 and transverse sills 6 and 7. The transverse sill 7 at the rearmost end of the body, extends slightly above the top of the floor 4, and pivotally secured thereto by hinges 8, is a closure door or lid 9, comprising a wooden frame sheathed in sheet metal, and having a handle 10 by which it may be swung to opened or closed positions. The door 9 is shaped to conform with the contour of the rear deck when in closed position, at which time it closes the substantially rectangular entrance extending throughout portions of the top and rear parts of the deck to the floor sill 7. On the under side or inside of the door 9, a comparatively deep cushion 11 is carried, while a seat cushion 12, also of comparatively great depth, is slidable on the floor 4. A set of interconnected levers or links are provided on both sides of the cushions, each set consisting of a pair of folding or jointed links 13 and 14 having their adjacent ends pivoted together at 15, the link 13 being pivoted at 16 to the closure lid adjacent its upper end, and the link 14 being pivotally connected at 17 with a bracket 18 fixedly secured to the floor 4, and a drag link or a draw bar 19 having its opposite ends pivotally connected as at 21 and 22 respectively, to an intermediate portion of the link 14 and to a bracket 23 carried by the seat cushion 12.

With the construction thus described, it will be apparent that when the closure lid is lifted or swung open, the folded levers or links 13 and 14 will straighten out and the connecting drag link 19 will cause the seat cushion 12 to slide rearwardly into the position shown in Figure 1. In such position the weight of the back cushion 11 and lid holds the lid open and prevents accidental closing or forward movement thereof, while the extended links 13 and 14 hold the door against further rearward swinging movement. Upon lowering the lid the levers pull the seat cushion 12 forward to provide ample clearance space for the back cushion 11, which because of its depth approaches quite closely to the floor. Since the two cushions do not interfere with each other in their relative movement to and from folded and open positions, it will be obvious that a deeply cushioned seat and back may be employed for the riding comfort of rumble seat passengers.

While the invention has been described in but a single embodiment, it is to be understood that it is not limited to the exact details but that such modifications may be made as come within the scope of appended claims.

I claim:

1. In an automobile body, the combination with a rear deck having an opening therein, of a hinged closure door for said opening, folding links adapted when extended to hold said door in open position, a cushion carried by said door forming a back rest, a seat cushion slidable on the floor of the deck, and a connection between one of said links and said seat cushion for sliding said cushion in unison with the movement of said door.

2. In an automobile body, the combination with a rear deck having an opening in the top and rear portions thereof extending substantially to the floor of the deck, of a closure door therefor, hinged at its bottom to the body adjacent the floor, folding links which when extended hold the door in an open position to constitute a back rest, a seat slidable on the floor of the deck, and a drag link between the seat and one of the folding links causing a sliding movement of the seat in unison with the swinging movement of the closure door.

3. In combination a body deck having an entrance opening extending to the deck floor, a closure door for the opening, a hinged connection between the bottom of the door and said floor, collapsible linkage which when extended holds the door open, a seat slidable substantially radially of the axis of said hinged connection and a connection between said linkage and said seat whereby the seat is slidable automatically with the swinging movement of the door toward or from the hinged connection.

4. In an automobile body, the combination with a rear deck having an opening therein, of a closure door for said opening, hinged at its bottom to the body, a cushion carried by the door forming a back rest, a pair of links having their adjacent ends pivoted together and their remote ends pivoted to the body and door respectively, and adapted to be folded about their pivotal connections when the door is closed and to be extended to a substantially straight line when the door is open to hold the door in open position, a seat cushion mounted in the body independently of the door and adapted for longitudinal movement, and a link pivoted at opposite ends to the seat and to one of the first mentioned links, whereby said seat is automatically moved with the swinging movement of the door.

In testimony whereof I affix my signature.

DAVID M. KLAUSMEYER.